June 12, 1923.
J. M. HERAUCOURT
1,458,823
AUTOMOBILE THEFT ALARM
Filed June 22, 1922
2 Sheets-Sheet 1
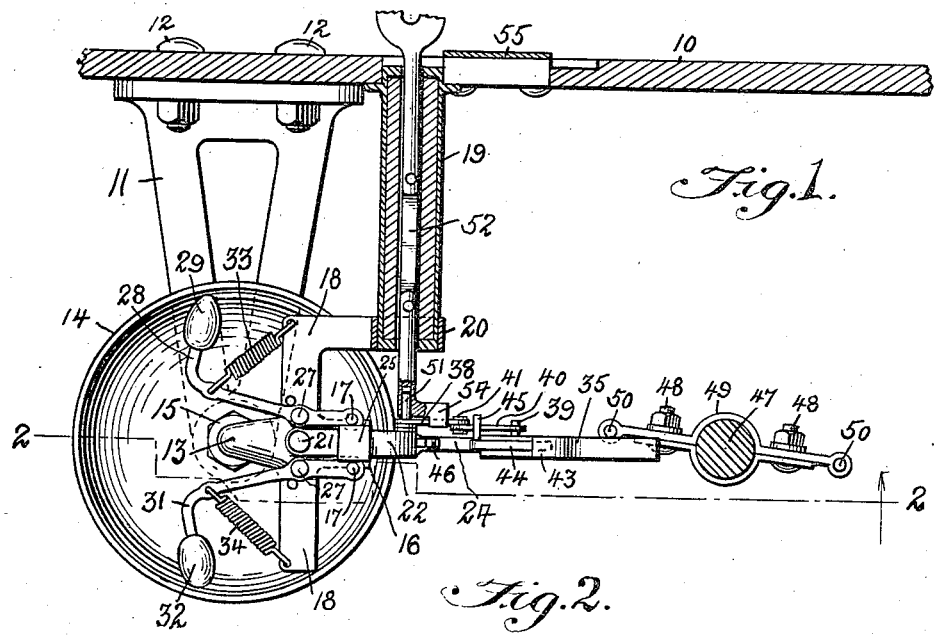
Fig.1.
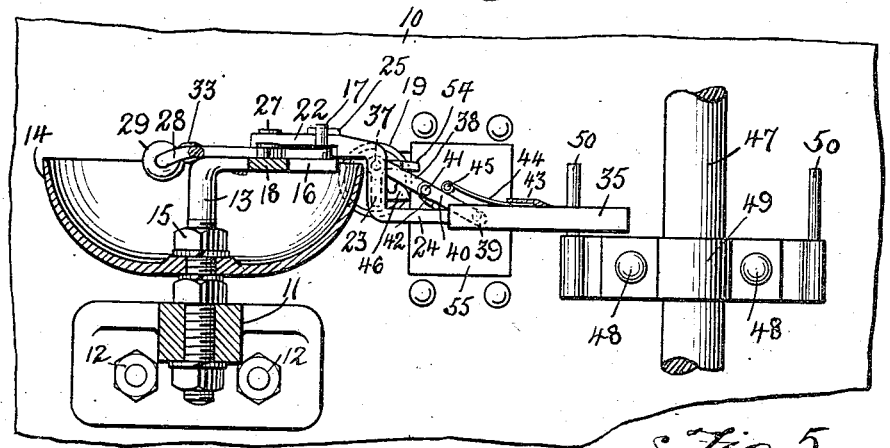
Fig.2.
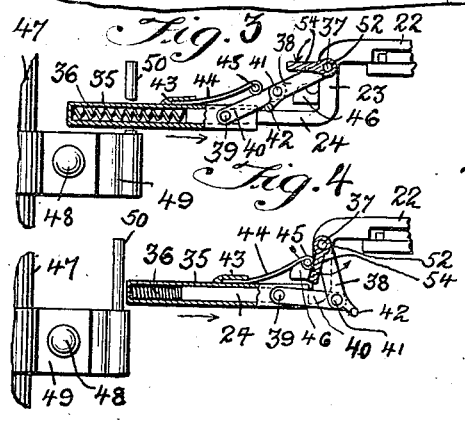
Fig.3.
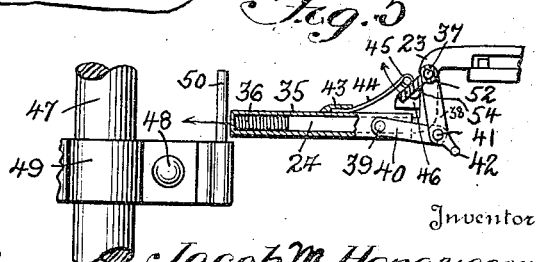
Fig.5.
Fig.4.
Inventor
Jacob M. Heraucourt
By Geo. P. Kimmel
Attorney June 12, 1923.
J. M. HERAUCOURT
AUTOMOBILE THEFT ALARM
Filed June 22, 1922
1,458,823
2 Sheets-Sheet 2
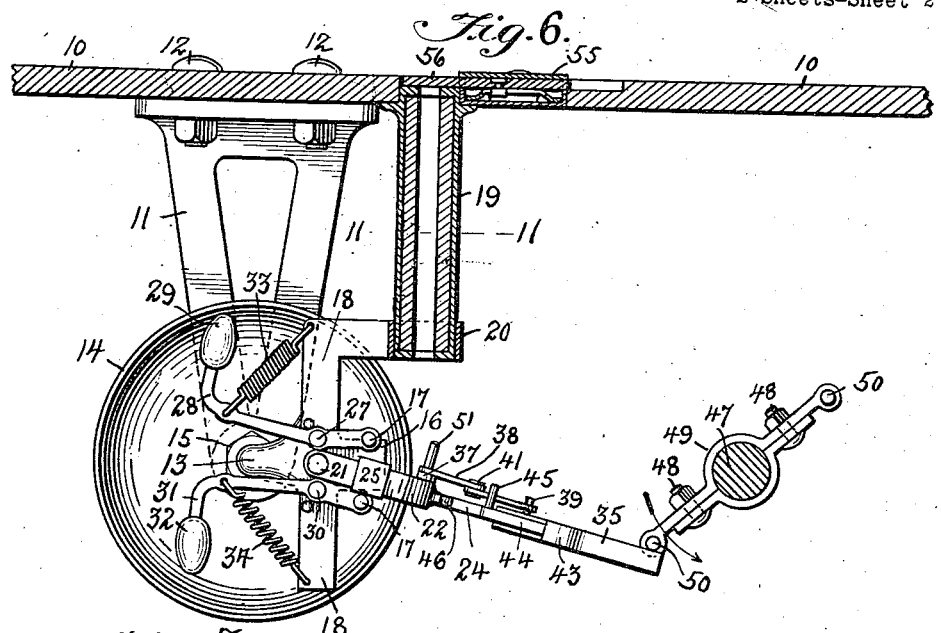
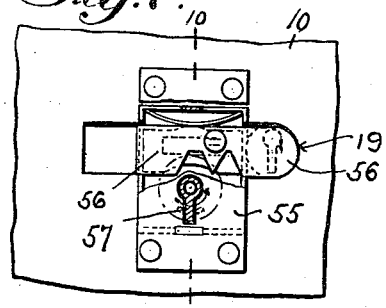
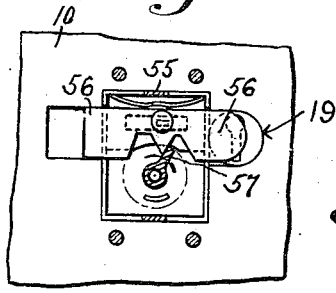
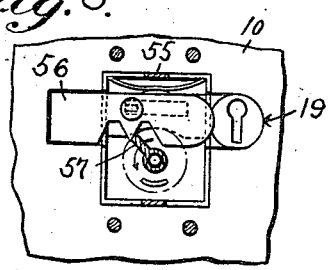
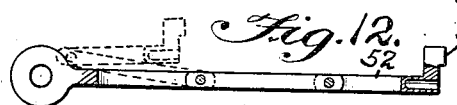
Inventor
Jacob M. Heraucourt
By
Geo. P. Kunnel
Attorney Patented June 12, 1923.

1,458,823

UNITED STATES PATENT OFFICE.

JACOB MATHEW HERAUCOURT, OF NEW ORLEANS, LOUISIANA.

AUTOMOBILE THEFT ALARM.

Application filed June 22, 1922. Serial No. 570,161.

*To all whom it may concern:*

Be it known that I, JACOB MATHEW HERAUCOURT, a citizen of the United States, residing at New Orleans, in the parish of Orleans and State of Louisiana, have invented certain new and useful Improvements in Automobile Theft Alarms, of which the following is a specification.

This invention relates to safety appliances for vehicles, to sound a warning if an attempt be made surreptitiously to move the vehicle, and has for one of its objects to simplify and improve the construction and increase the efficiency and utility of devices of this character.

Another object of the invention is to provide a device of this character which may be applied to vehicles of various constructions and forms without material structural change either in the vehicle or in the apparatus.

With these and other objects in view the invention consists in certain novel features of construction as hereinafter shown and described and then specifically pointed out in the claims, and in the drawings illustrative of the preferred embodiment of the invention:—

Figure 1 is a side elevation, partly in section, of the improved device.

Fig. 2 is a section on the line 2—2 of Fig. 1, looking in the direction of the arrow.

Fig. 3 is a detail illustration of the construction and operation of the tripper mechanism with the parts in distended or operative position.

Fig. 4 is a view similar to Fig. 3, showing the parts in withdrawn or inoperative position.

Fig. 5 is a view similar to Figs. 3 and 4, with the key arranged to release the tripper mechanism.

Fig. 6 is a view similar to Fig. 1, showing the parts in position ready to sound the alarm.

Figs. 7, 8 and 9 are detail views illustrating the construction and operation of the guard for the operating key.

Fig. 10 is a section on the line 10—10 of Fig. 7.

Fig. 11 is a transverse section on the line 11—11 of Fig. 6.

Figs. 12 and 13 are views of the folding key device.

The improved device may be employed in connection with any form of vehicle having a rotating axle or shaft, but is designed more particularly for use upon motor driven vehicles to sound an alarm if an attempt be made to surreptitiously move the vehicle.

The improved device may be located at any convenient point, but will generally be located beneath the deck or floor of the vehicle, a portion of which is represented at 10.

The improved device includes a bracket or hanger 11 attached as by bolts 12 to the floor 10, and has an arm 13 extending therefrom, the latter having a gong 14 of suitable construction supported thereon by clamp nuts 15.

Branching from the arm 13 is an extension 16, and extending from the portion 16 are lateral arms 18, and attached to floor 10 is a tubular guide member 19, the latter attached at 20 to the member 18.

By this means the portions 16 and 18 and 19 are rigidly supported from the floor 10 and with the portion 13 held from rotation in the hanger 11.

Pivoted at 21 to the member 16 is an operating bar 22 having an offset 23 and an extension 24 at one end, and with a bearing plate 25.

Pivoted at 27 to the member 16 at one side of the pivot 21, is a lever arm 28 having a terminal "hammer" 29, and pivoted at 30 at the other side of the pivot 21 is a similar lever arm 31 having a "hammer" 32.

A spring 33 holds the lever arm 28 in inoperative position with its pin 17 normally against the plate 25 at one side, while a spring 34 holds the lever arm 31 with its pin 17 against the plate 25 at the other side. Thus when the bar 22 is in neutral position as shown in Fig. 1, both of the hammers 29 and 32 will be likewise held yieldably in neutral or inoperative position.

Slidably disposed upon the extension 24 is a tubular member 35 yieldably supported in distended position by an internal spring 36. Pivoted at 37 to the portion 23, is a link 38, and pivoted at 39 to the tubular member 35 is another and similar link 40, the two links being pivotally united at 41. One of the links, for instance the link 38, is formed with an extension 42 to provide a stop to limit the movement of the links in one direction.

Attached at 43 to the tubular member 35 is a leaf spring 44 having a lateral enlargement at the free end and a stud 45 extending laterally from the enlargement.

Extending from the portion 23 is a notched stud 46 with which the enlarged terminal of the spring engages as the member 35 is moved longitudinally of the portion 24, to yieldably lock the member 35 in inoperative position.

A portion of a drive shaft of the vehicle is represented at 47, and coupled to the shaft as by clamp bolts 48 is a tripping device 49 having projecting pins 50, the pins extending into the path of the member 35 when the latter is extended as shown in Figs. 1, 2, 3 and 6, and passing the adjacent end of the member when the latter is withdrawn as in Figs. 4 and 5.

The pivot member 37 is extended as shown at 51 in Figs. 1 and 6, to be engaged by the terminal socket of a key member 52, the latter formed in foldable sections, as shown, to occupy a relatively small space when not in use.

The tubular member 19 forms a guide for the key member 52, and is formed with a longitudinal bore corresponding to the body or stock of the key and a lateral communication passage for the "ward" portion 54 of the key, as represented in Figs. 7, 8, 9 and 11.

The member 19 does not project entirely through the floor 10 as shown in Figs. 1 and 6, and embedded in the floor adjacent the member 19 is a lock casing 55 having a sliding bolt 56 which constitutes a closure for the intake end of the keyway of the member 19, when in projected position.

Initially the lock member 55 will be actuated by a key member 57 to withdraw the bolt 56 to expose the keyway in the member 19, as shown in Fig. 8. The jointed key 52 is then inserted and engaged by a socket with the pin 51 to hold it in position and then rotated for a short distance to cause its ward 54 to engage the link 38 and "break" the links 38 and 40 and move the tubular member 35 longitudinally of the portion 24 against the resistance of the spring 36, until the terminal enlargement of the spring 44 engages the notched lug 46 which will hold the member 35 out of the path of the pins 50 which are rotating.

The continued rotation of the shaft 47 does not effect the alarm devices when the member 35 is withdrawn. The key member 52 must not be reversely rotated after it has "broken" the links 38 and 40, otherwise the "ward" 54 would engage the pin 45 and retract the links and release the member 35 which would be returned to its former position into the path of the revolving pins 50. Therefore after the key 52 has been rotated a sufficient distance to "break" the links 38 and 40 it is withdrawn entirely, and the smaller key 57 operated to move the bolt 56 outwardly and cover the entrance to the keyway in the member 19.

When the vehicle is stopped and it is to be parked or stored, the key 57 is actuated to uncover the keyway to the member 19, and the key member 52 inserted and rotated reversely to cause the "ward" 54 to engage the pin 45 and detach the enlarged terminal of the spring 44 from engagement with the catch 46 and thus release the member 35 which will be forced by the reaction of the spring 36 into the paths of the pins 50, as shown in Figs. 1, 2, 3 and 6.

The key member 52 is then withdrawn and the key member 57 operated to move the bolt 56 over the keyway of the member 19 and thus prevent surreptitious access thereto, to tamper with the member 35.

With the member 35 thus extending into the paths of the pins 50, any attempt to move the vehicle in either direction will cause the rotation of the shaft 47 and thus sound the alarm.

The improved device is simple in construction, can be applied without material structural change in either of the devices, and operates effectually for the purposes described.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention, what is claimed as new is:—

1. In an apparatus of the class described, a gong, a swinging operating bar, a lever arm pivotally supported and extending into the path of said bar and carrying a hammer element adapted to engage said gong, means for increasing the length of said bar, and means for engaging said bar when extended to impart motion to said lever arm.

2. In an apparatus of the class described, a rotating member, a gong, a bracket device supporting said gong, coacting lever devices swinging on said bracket and each carrying a hammer adapted to contact with said gong, a member swinging on said bracket between said hammer levers, a spring controlled portion longitudinally adjustable relative to said swinging member, means for projecting said spring controlled portion into the path of said rotating member to actuate the hammer levers, and means for withdrawing said spring controlled portion from the path of said rotating member.

3. In an apparatus of the class described, a rotating member, a gong, a bracket device supporting said gong, coacting lever devices swinging on said bracket and each carrying a hammer adapted to contact with said gong, a member swinging on said bracket between said hammer levers, a spring controlled portion longitudinally adjustable relative to said swinging member, jointed links pivoted respectively to said bracket device and to said spring controlled portion and operating when in longitudinal alinement to hold the spring controlled portion in the path of said rotating member to cause the rotating member to actuate the hammer levers, and means for moving said links out of alinement to permit the spring controlled portion to be withdrawn from the path of the rotating member.

4. In an apparatus of the class described, a rotating member, a gong, a bracket device supporting said gong, coacting lever devices swinging on said bracket and each carrying a hammer adapted to contact with said gong, a member swinging on said bracket between said hammer levers, a spring controlled portion longitudinally adjustable relative to said swinging member, jointed links pivoted respectively to said bracket device and to said spring controlled portion and operating when in longitudinal alinement to cause the rotating member to actuate the hammer levers, a catch carried by said swinging member, a resilient member attached to said spring controlled portion and engageable with said catch when spring controlled portion is disposed in withdrawn position, means for actuating said spring controlled portion, and means for releasing said resilient member.

5. In an apparatus of the class described, a rotating member, a gong, a bracket device supporting said gong, and including a key guide, jointed links pivoted respectively to said bracket device and to said spring controlled portion and operating when in longitudinal alinement to hold the spring controlled portion in the path of said rotating member to cause the rotating member to actuate the hammer levers, a catch carried by said swinging member, a resilient member attached to said spring controlled portion and engageable with said catch when said spring controlled portion is disposed in withdrawn position, a key member insertible through said key guide and having a lateral ward adapted to engage said links and withdraw said spring controlled member from the path of said rotating member and engage said resilient member with the catch when rotated in one direction, and disconnect the resilient member from the catch and release the spring controlled member when rotated in the opposite direction.

6. In an apparatus of the class described, a supporting structure, a rotating member, a bracket device including a key guide attached to said supporting structure, a gong carried by said bracket, coacting lever devices swinging on said bracket and each carrying a hammer adapted to contact with said gong, a member swinging on said bracket between said hammer levers, a spring controlled portion longitudinally adjustable relative to said swinging member, means for projecting said spring controlled portion into the path of said rotating member to actuate the hammer levers, and means for withdrawing said spring controlled portion from the path of said rotating member, a catch carried by said swinging member, a resilient member attached to said spring controlled portion and engageable with said catch when said spring controlled portion is disposed in withdrawn position, a key member insertible through said guide and having a lateral ward adapted to engage said links and withdraw said spring controlled member from the path of said rotating member and engage said resilient member with the catch when rotated in one direction and disconnect the resilient member from the catch and release the spring controlled member when rotated in the opposite direction, a lock device attached to said supporting structure and including a bolt movable over the entrance to said key guide.

In testimony whereof, I affix my signature hereto.

JACOB MATHEW HERAUCOURT.